(12) United States Patent
Ghilbert-Simon et al.

(10) Patent No.: US 8,864,386 B2
(45) Date of Patent: Oct. 21, 2014

(54) ROLLER BEARING AND CAGE FOR A ROLLER BEARING

(75) Inventors: Aurelien Ghilbert-Simon, Saint Roch (FR); Helmut Hauck, Euerbach (DE); Thomas Heege, Schweinfurt (DE); Hubert Herbst, Gädheim (DE); Sandra Kamm, Gochsheim (DE)

(73) Assignee: Aktiebolaget SKF, Goteborg (SE)

( * ) Notice: Subject to any disclaimer, the term of this patent is extended or adjusted under 35 U.S.C. 154(b) by 14 days.

(21) Appl. No.: 13/309,742

(22) Filed: Dec. 2, 2011

(65) Prior Publication Data

US 2012/0155794 A1 Jun. 21, 2012

(30) Foreign Application Priority Data

Dec. 6, 2010 (DE) .......... 10 2010 062 479

(51) Int. Cl.
| | |
|---|---|
| *F16C 33/38* | (2006.01) |
| *F16C 19/06* | (2006.01) |
| *F16C 43/06* | (2006.01) |
| *B21D 53/12* | (2006.01) |
| *F16C 19/16* | (2006.01) |

(52) U.S. Cl.
CPC .......... *F16C 19/163* (2013.01); *F16C 33/3843* (2013.01); *F16C 43/06* (2013.01); *F16C 33/3887* (2013.01); *B21D 53/12* (2013.01)
USPC .......... 384/523; 384/510; 384/528; 384/614; 29/898.67

(58) Field of Classification Search
USPC ......... 384/470, 513, 523, 528, 534, 560, 572, 384/576, 614, 621–623, 482, 526, 609, 615, 384/580, 510; 29/898.065, 898.067
See application file for complete search history.

(56) References Cited

U.S. PATENT DOCUMENTS

| | | | | |
|---|---|---|---|---|
| 2,359,120 | A | * | 9/1944 | Kilayin .......... 384/580 |
| 3,272,574 | A | * | 9/1966 | Tassone et al. .......... 384/482 |
| 3,399,936 | A | * | 9/1968 | Vannest .......... 384/528 |
| 3,450,449 | A | * | 6/1969 | Sibley et al. .......... 384/465 |
| 3,471,208 | A | * | 10/1969 | Vannest .......... 384/530 |
| 3,482,297 | A | * | 12/1969 | Vannest .......... 29/898.067 |
| 3,486,212 | A | * | 12/1969 | Vannest .......... 384/523 |
| 3,582,165 | A | * | 6/1971 | Koch .......... 384/580 |
| 3,628,839 | A | * | 12/1971 | Vannest .......... 384/470 |
| 3,685,877 | A | * | 8/1972 | Gould .......... 384/470 |
| 3,743,369 | A | * | 7/1973 | Langstrom .......... 384/470 |
| 3,760,914 | A | * | 9/1973 | Gelbrich .......... 192/45.014 |
| 4,019,791 | A | * | 4/1977 | Loberg .......... 384/526 |
| 4,324,444 | A | * | 4/1982 | Buczynski et al. .......... 384/526 |

(Continued)

FOREIGN PATENT DOCUMENTS

| | | | |
|---|---|---|---|
| DE | 2329911 A1 | 1/1975 | |
| DE | 3307845 A1 | * 9/1984 | .......... F16C 19/06 |

(Continued)

*Primary Examiner* — Marcus Charles
(74) *Attorney, Agent, or Firm* — Bryan Peckjian; SKF USA Inc. Patent Department

(57) ABSTRACT

A roller bearing comprises an inner ring, an outer ring and an annular cage. The annular cage retains and guides at least one roller body. The annular cage comprises at least one pocket for retaining the roller body and at least one retaining rim disposed on one axial end of the pocket. The retaining rim extends at least in the radial direction relative to a main body of the cage.

15 Claims, 4 Drawing Sheets

(56) References Cited

U.S. PATENT DOCUMENTS

| | | | |
|---|---|---|---|
| 4,472,006 A * | 9/1984 | Goransson et al. | 384/576 |
| 4,620,806 A * | 11/1986 | Rabe | 384/572 |
| 4,722,617 A | 2/1988 | Stella et al. | |
| 4,838,712 A * | 6/1989 | Kubo et al. | 384/523 |
| 4,978,237 A * | 12/1990 | Motohashi et al. | 384/580 |
| 5,312,191 A * | 5/1994 | Gallant | 384/470 |
| 5,810,484 A * | 9/1998 | Bustamante et al. | 384/614 |
| 5,816,713 A * | 10/1998 | Prock et al. | 384/572 |
| 6,425,182 B1 * | 7/2002 | Honda et al. | 29/898.067 |
| 7,524,116 B2 | 4/2009 | Haepp | |

FOREIGN PATENT DOCUMENTS

| | | | | |
|---|---|---|---|---|
| DE | 3824125 A1 | 1/1989 | | |
| DE | 19745410 A1 | 4/1999 | | |
| DE | 10239742 A1 | 11/2003 | | |
| DE | 102004013804 A1 | 10/2005 | | |
| DE | 102009035562 A1 | 10/2005 | | |
| DE | 102009019677 A1 | 11/2010 | | |
| EP | 2003351 A1 | 12/2008 | | |
| EP | 2042754 A2 | 4/2009 | | |
| FR | 2308013 A1 | 11/1976 | | |
| FR | 2927679 A1 | 8/2009 | | |
| GB | 120567 A | 7/1919 | | |
| GB | 966128 A | * 8/1964 | | F16C 33/38 |
| JP | 2004052785 A | 2/2004 | | |
| JP | 2008002683 A | 1/2008 | | |
| WO | WO2010133542 A1 | 11/2010 | | |

* cited by examiner

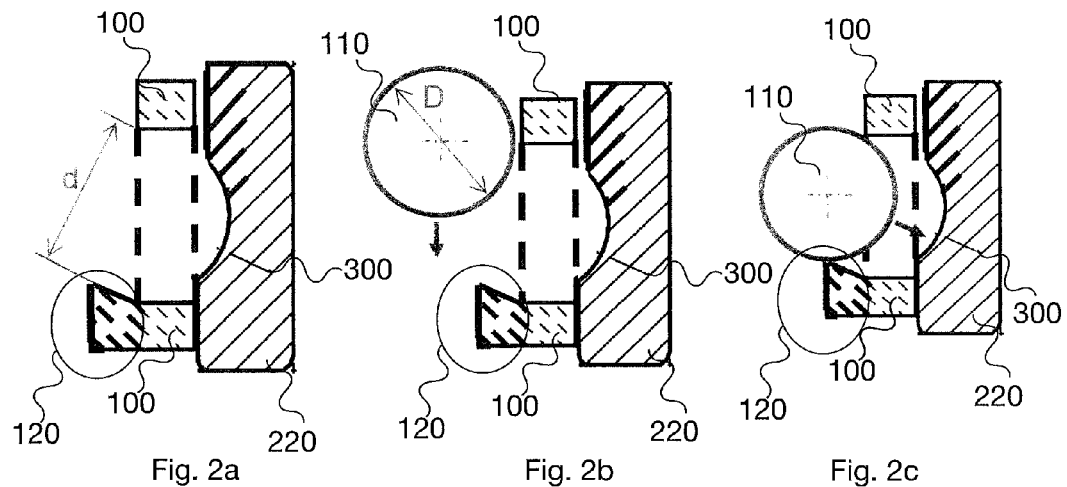
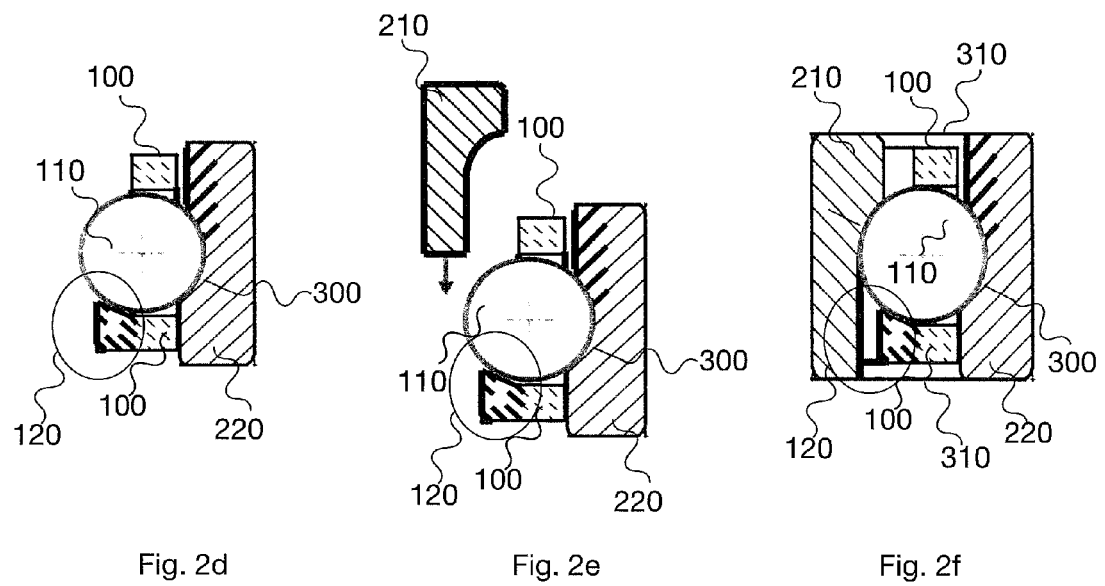

ROLLER BEARING AND CAGE FOR A ROLLER BEARING

CROSS-REFERENCE

The present application claims priority to German patent application no. 10 2010 062 479.9 filed on Dec. 6, 2010, the contents of which are incorporated herein by reference as if fully set forth herein.

TECHNICAL FIELD

The present invention relates to a roller bearing and a cage for a roller bearing, such as an angular contact ball bearing and a cage for an annular contact ball bearing.

BACKGROUND ART

As is illustrated in the cross-sectional view of an annular contact ball bearing shown in FIG. 3, known roller bearings 350 are typically comprised of an inner ring 360, an outer ring 370 and roller bodies 390. The roller bodies, e.g., balls, cones, cylinders, etc., are guided by a cage 380. In the following, ball bearings will be discussed as a representative example of the prior art.

FIG. 3 further shows the roller bearing 350 designed as an annular contact ball bearing, which is indicated by the diagonal axis 400. The cage 380 includes openings or pockets 410 for guiding the roller bodies and the roller bodies can be inserted into the openings or pockets 410. Thus, the roller bodies 390 are respectively guided in the pockets 410 during operation of the bearing 350. In addition, the cage 380 contributes to stabilizing the bearing and/or the bearing components during assembly of the bearing 350.

FIG. 4 shows a schematized cutout of the cage 380, which is formed in an annular manner and has been cut away at the cut lines 420 and 430. FIG. 4 further shows two pockets 410 that are formed to respectively receive two roller bodies, such as e.g., balls. A bridge 440 is located between the two pockets 410.

Snap-type cages are known that, after completely inserting all of the balls, are laterally pressed against the balls between the two bearing rings (oval clamping). In the alternative, snap-type cages may first receive all the balls, then may be mounted on a ring (inner- or outer ring) and subsequently may be finally assembled with a second ring (outer- or inner ring, if necessary, with the assistance of known physical aids such as warming up, cooling down, plastic deformation, etc.) into a self-retaining bearing.

Annular-guided, non-snap-type cages are another variant that initially receive all balls when placed over the inner ring. However, the balls must be held by an additional tool during the bearing assembly in order to subsequently be assembled with the outer ring into the bearing (if necessary, with the assistance of known physical aids such as warming up, cooling down, plastic deformation, etc.).

Snap-type cages are simple to assemble. However, only a limited number of roller bodies can be inserted, because the width of the bridge 440 of the cage between the pockets 410 must be designed bigger (longer) due to the snap-in forces, i.e. the bridge 440 must be relatively wide in order to be able to generate the necessary retaining force.

Non-snap-type cages can retain more roller bodies, because no forces act on such cages when the roller bodies are inserted. However, the roller bodies are not held by the cage, so that the final assembly of the bearing must be carried out in a substantially more costly manner, because the risk of the roller bodies falling out during the final ring mounting step exists.

Thus, both roller-body-guided (snap-type cages) and ring-guided cages have been utilized in the prior art. The latter have the advantage relative to the former that the bridge 440 between the roller bodies can be designed smaller and thus more balls can be retained in the same installation space. In this case, the bearing will have a higher load rating overall.

However, the disadvantage is that the roller bodies (e.g., balls) can not be retained by the cage during the assembly process, which makes the assembly process more complicated and/or burdensome.

SUMMARY

It is an object of the present teachings to disclose an improved concept for a roller bearing and a cage.

One aspect of the present teachings is based upon the recognition that the disadvantages of the known ring-guided cages can be overcome by providing a retaining rim (or retaining flange), which is affixed to the cage. In such embodiments of the present teachings, the roller bodies can be reliably prevented from falling out during the assembly of the bearing.

In another supplemental aspect of the present teachings, the retaining rim is preferably affixed on or to an axial end of the cage. In such embodiments of the present teachings, the insertion of the roller bodies, for example the balls, during the assembly of the bearing can be further simplified.

The present teachings can be utilized to provide a cost-effective system for assembling a ring-guided (not snap-type) cage, as well as to provide a cage design that is capable of receiving (retaining) a maximum number of roller bodies in the bearing.

In another aspect of the present teachings, the assembly of an angular contact ball bearing can be facilitated and/or simplified. In such embodiments of the present teachings, a cage may be provided, e.g., for a two-row angular contact ball bearing. In this aspect of the present teachings, a ring-guided cage is redesigned (as compared to the known art) so that its assembly process can be significantly simplified. This may be achieved by disposing a retaining rim on a side of one or more pockets at least around a portion of the circumference of the cage. More preferably, a retaining rim is associated with every pocket of the cage and thus retaining rims are provided around the entire circumference of the cage. In this aspect of the present teachings, the retaining rim represents a guiding-in means for inserting the roller bodies (e.g., balls) into the pockets of the cage. The insertion of the roller bodies is preferably achieved by redirecting the usual axial ball insertion direction into a combined axial/radial insertion direction. Furthermore, it is possible to prevent the roller bodies (e.g., balls) from inadvertently falling out of the pockets during the subsequent assembly steps of the bearing, in particular when the second ring is mounted on the combined first ring and cage with the roller bodies disposed therein.

Further objects, embodiments, advantages and designs will be explained in the following with the assistance of the exemplary embodiments and the appended Figures.

BRIEF DESCRIPTION OF THE DRAWINGS

FIGS. 2a-f show a representative bearing assembly method that utilizes the exemplary embodiment of the cage shown in FIG. 1.

DETAILED DESCRIPTION OF THE INVENTION

Figure 1:
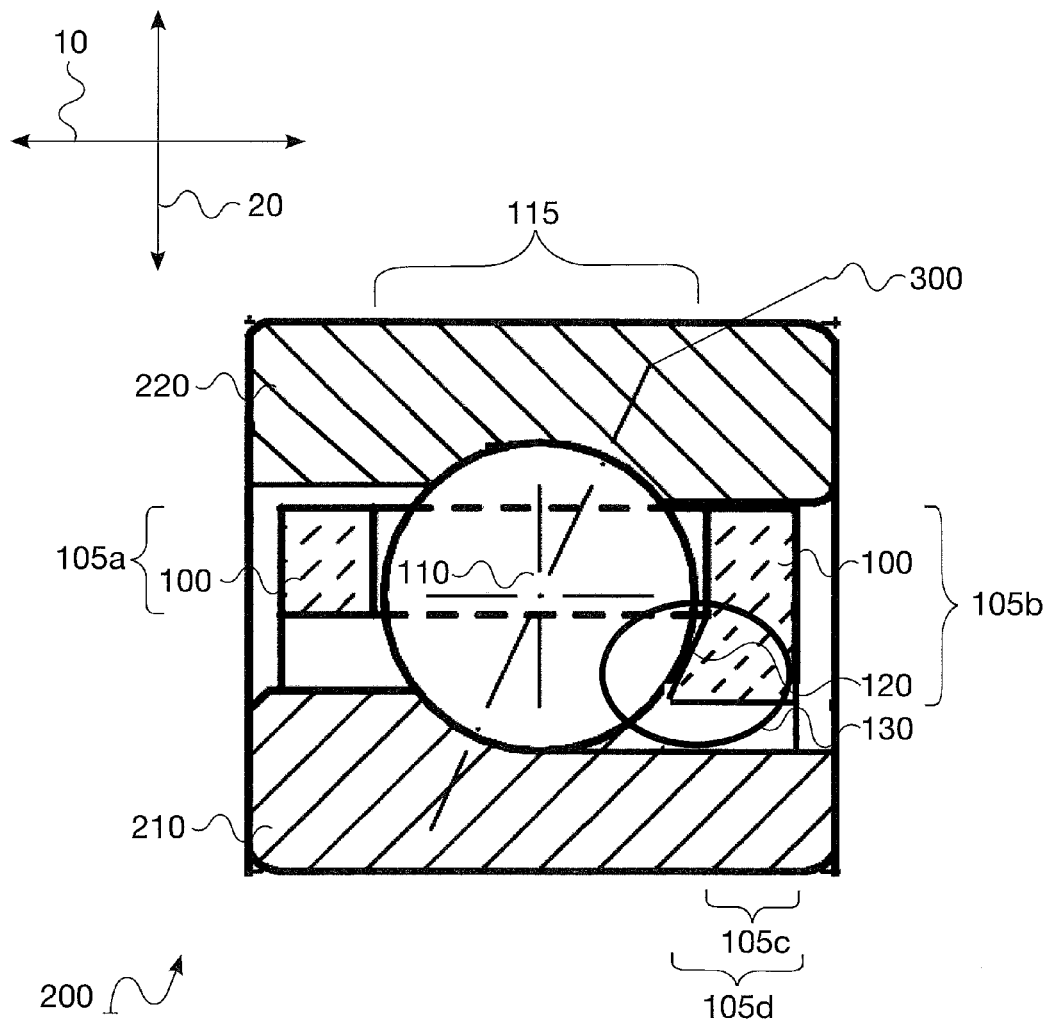
FIG. 1 shows an exemplary embodiment of a roller bearing having an exemplary embodiment of a cage.
Figure 3:
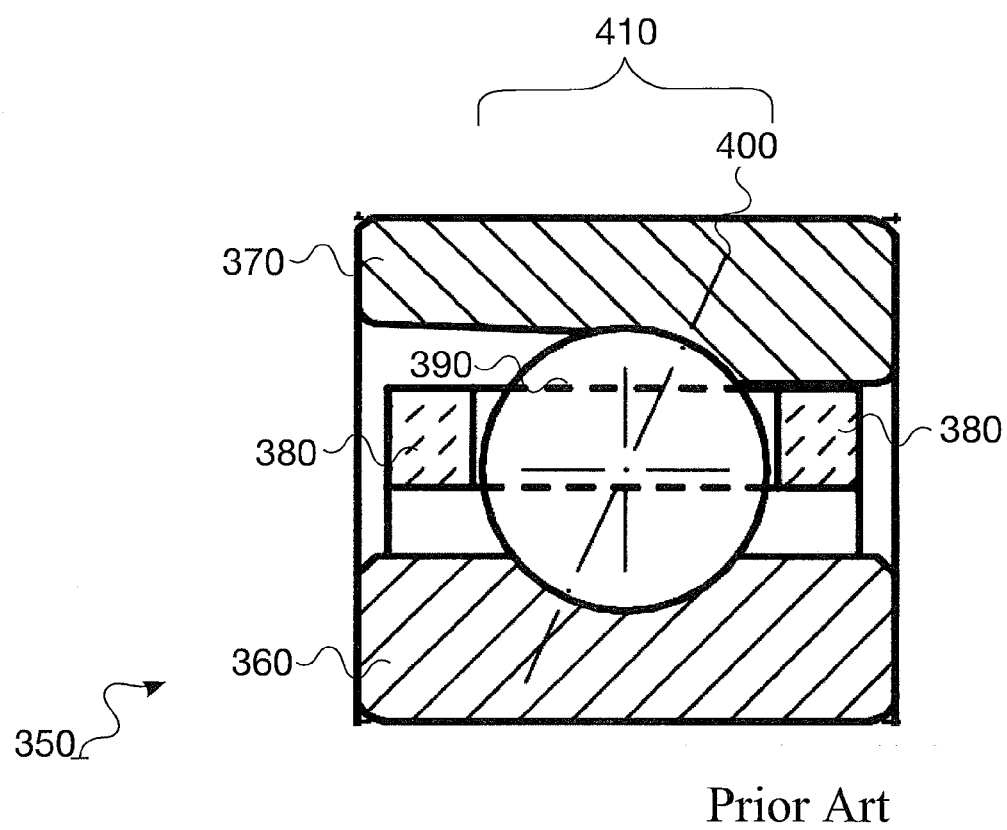
FIG. 3 shows a known roller bearing having a known cage.

FIG. 1 shows an exemplary embodiment of a roller bearing 200 according to the present teachings.

The roller bearing 200 comprises an inner ring 210 and an outer ring 220. In the representative embodiment of FIG. 1, the roller bearing 200 is designed as an angular contact ball bearing and a diagonal roller body contact axis 300 is shown. However, as will be readily understood by persons of ordinary skill in the art after considering the following description and the appended drawings, the present teachings may be utilized with a variety of roller bearings, such as other types of ball bearings, cylindrical bearings, spherical bearings, tapered roller bearings, etc. The present teachings are not particularly limited in this regard. Also, the cage 100 may be made of metal, e.g., brass, steel, bronze, copper, etc. or may be made of a generally rigid polymer material, e.g., polyamide.

For the sake of clarity, only one roller body 110 is shown in the drawings, although it is understood that a plurality of roller bodies 110 will typically be utilized in normal operation of the roller bearing 200.

The roller body 110 and the cage 100 are located between the inner ring 210 and the outer ring 220. The cage 110 has a generally annular shape and is designed to receive (retain or guide) roller bodies 110 for the roller bearing 200. FIG. 1 shows a cross-section through one pocket 115 of the cage 100. Arrow 10 indicates the axial direction of the bearing 200 and arrow 20 indicates the radial direction of the bearing 200.

Furthermore, FIG. 1 shows a retaining rim 120 that is directed or extends towards the inner bearing ring 210. However, in general, it is conceivable that the retaining rim 120 may be directed or may extend towards the outer bearing ring 220 in other embodiments of the present teachings. That is, embodiments of the present teachings are not limited to the geometry of FIG. 1.

In the present embodiment, the cage 100 has at least one pocket 115 for receiving (retaining and/or guiding) a roller body 110. At least one retaining rim 120 for the roller body 110 is disposed on an axial end of the pocket 115, i.e. on the left or right axial edge with reference to FIG. 1.

The retaining rim 120 may project beyond a main portion (body) of the cage 100 in the radial direction and/or may extend relative to a main portion of the cage 100 at least in the radial direction. The retaining rim 120 may be disposed on an axial end of the pocket 115 that lies either radially inwardly or outwardly of the main body of the cage 100. In addition, the retaining rim 120 can also extend in the axial direction, e.g., it can partially extend into a space defined by the inner edge of the pocket 115 as shown in FIG. 1.

The retaining rim 120 can extend in an annular manner along the cage 100, e.g., along its inner- or outer-circumference, and for example, can be formed like a bridge or a spring. The retaining rim (flange) 120 may be resiliently elastic to allow the roller body to be squeezed through an opening (d) (see FIG. 2 below) that is smaller than the diameter (D) of the roller bearing, although as will be discussed below, the opening (d) may also be larger than the diameter (D). In other exemplary embodiments, the retaining rim 120 can also be L-shaped and thus can extend in the both the radial and axial directions. Many types of manifestations of the retaining rim 120 are conceivable based upon the present teachings. For example, the retaining rim 120 may also be formed in the shape of a trough, a depression, a notch, a bridge or the like.

In some embodiments of the present teachings, the cage 100 and the retaining rim 120 can be designed as one-piece, i.e. in this case the retaining rim 120 can be an integral part of the cage 100. However, a one-piece design is optional. In other embodiments, the cage 100 and the retaining rim 120 can also be designed in a two- or more-pieced manner The various pieces can then be connected with each other using known methods, such as adhesive, welding or other friction-fit connecting techniques.

The retaining rim 120 can thus project in the axial direction towards the interior of the pocket and/or towards the roller body 110. As FIG. 1 further shows, the exemplary retaining rim 120 can also project beyond the pocket walls in the radial direction (i.e. radially inwardly in the present embodiment).

In the following description, the "wall height" of the cage 110 and pocket 115 will be used to indicate the extension or length of the cage body in the radial direction. In FIG. 1, the wall heights of the cage 100 around the pocket 115 are indicated by 105a and 105b and it can be seen that, at the point where the retaining rim 120 extends from the main body of the cage 100, the wall height 105b of the cage 100 exceeds the wall height 105a outside of the area of the retaining rim 120 (i.e. the main body of the cage 100). The amount that the wall height 105b of the cage 100 at the point of the retaining rim 120 exceeds the wall height 105a of the main body can be, e.g., exactly the extension or length of the retaining rim 120 in the radial direction.

In the exemplary embodiment of FIG. 1, it can be further recognized that the retaining rim 120 also partially extends in the axial direction towards the interior of the pocket 115. The axial extension (length) of the pocket wall is indicated by 105c in FIG. 1. The wall thickness 105d (axial extension) in the area of the retaining rim 120 exceeds the wall thickness 105c in the area outside of the retaining rim 120 (i.e. the main body of the cage 100). The amount that the wall thickness 105d of the cage 100 at the point of the retaining rim 120 exceeds the wall thickness 105c can be, e.g., exactly the extension (length) of the retaining rim 120 in the axial direction.

Thus, the exemplary retaining rim 120 projects beyond the main body of the cage 100 in both the axial and radial directions.

Figure 4:
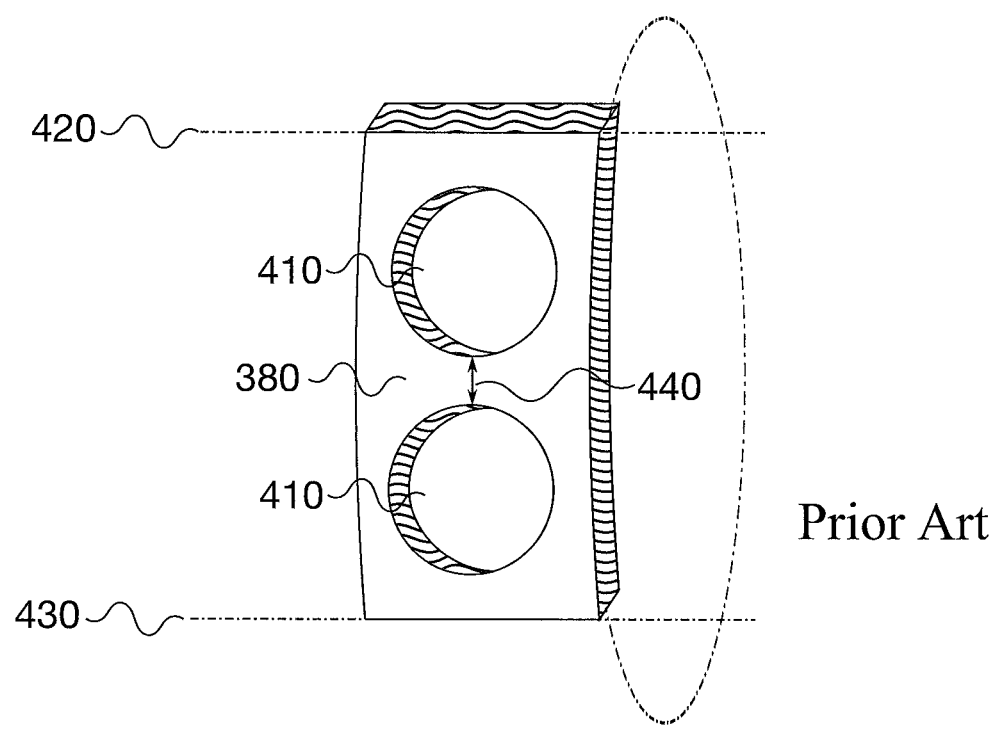
FIG. 4 shows a cutout of the known cage of FIG. 3.

In the exemplary embodiment shown in FIG. 1, the cage 100 is designed to be mounted or disposed between an inner ring 210 and an outer ring 220 of the roller bearing 200 and to receive a maximum number of roller bodies 110 in accordance with the diameters of the inner ring 210 and the outer ring 220. That is, the maximum number of roller bodies, which can be placed on the pitch circle of the bearing, is determined by the circumference (length) of the bearing pitch circle and the diameter of the roller bodies. However, the minimum bridge width should also be considered when dimensioning the bridges, because the guidance properties of the cage should be maintained. Therefore, the maximum number of roller bodies, which can be guided by the cage, is also determined, in part, by the width of the bridges, as was explained in more detail above with the assistance of FIG. 4.

In the present specification, the particular path, along which the middle point (center) of the roller bodies move during operation of a bearing, is understood to be the pitch circle of the bearing. The diameter of the bearing pitch circle can correspond, e.g., to the arithmetic mean of the diameters of the inner bearing ring 210 and the outer bearing ring 220.

If the sum of all spacings of the roller bodies on the bearing pitch circle is larger than the diameter of an individual roller body, then the maximum number of roller bodies is not present, because another roller body could be disposed on the bearing pitch circle and the bridges could be made smaller in a corresponding manner, without sacrificing the desired guidance properties of the cage.

In the present embodiment, the maximum number of roller bodies is provided in the bearing, i.e. the cage 100 possesses a maximum number of pockets 115. In other words, the cage 100 has a plurality of pockets 115, and the roller bodies 110 on the bearing pitch circle of the roller bearing 220 have a predetermined spacing from each other due to the arrangement of pockets 115. The sum of all spacings is smaller than eight-times the diameter of one roller body 110, wherein the minimum bridge width has been considered for maintaining the necessary guidance properties of the cage 100.

As the exemplary embodiment of FIG. 1 shows, the retaining rim 120 is disposed on the side of the annular cage 100 that faces towards the inner ring 210. However, in other embodiments of the present teachings, it is also conceivable that the retaining rim 120 is disposed on the side of the annular cage 100 that faces towards the outer ring 220.

The retaining rim 120 preferably may be designed so that the roller bodies 110 are prevented from falling out of the cage during the assembly of the bearing 200. For example, the annular cage 110 can be designed in a ring-guided manner and/or a non-snap-type manner In the following, a representative method for assembling the bearing will be explained in further detail with the assistance of FIGS. 2a-2f. Thus, embodiments of the present teachings also comprise methods for assembling a roller bearing 200.

The exemplary method shown in FIGS. 2a-2f comprises mounting the cage 100 on a first bearing ring 220, wherein the first bearing ring 220 can be either the inner bearing ring or the outer bearing ring of the bearing 200. The cage 100 has at least one pocket 115 for receiving a roller body 110 as well as at least one retaining rim 120 for retaining the roller body 110 preferably disposed on one axial end of the pocket 115. The retaining rim 120 extends in the axial and radial directions relative to remainder of the cage 100.

The exemplary method further comprising inserting roller bodies 110 into the cage 100 by moving the roller bodies 110 along a movement path that includes both radial and axial movement components relative to the cage 100. That is, in the present method, the roller bodies 110 are moved diagonally relative to the axial and/or radial direction of the finally-assembled bearing 200. As a result of this movement path, the present embodiment takes advantage of the retaining rim 120 during the assembly, because it facilitates the insertion of the roller bodies from an assembly-friendlier direction. Finally, the method also comprises mounting a second bearing ring 210 on the combination of the first bearing ring 220, the cage 100 and the roller bodies 110.

FIGS. 2a to 2f each show a bearing ring 220, which is preferably designed for an angular contact roller bearing, as indicated by the diagonal axis 300. Furthermore, FIGS. 2a to 2f show the cage 100 with the retaining rim 120 in a cross-section through a pocket 115, but the pocket is not provided with a reference number in FIGS. 2a to 2f for the sake of clarity.

FIG. 2a further shows the opening width d, which is provided between the retaining rim 120 and the pocket edge that is opposite thereof in the axial direction of the bearing 200. FIG. 2b shows the same elements as FIG. 2a. Furthermore, FIG. 2b shows the roller body 110 having diameter D being inserted into the pocket (115). In order to facilitate a simple insertion, the minimum opening amount d between the retaining rim 120 and the opposite edge of the pocket 115 optionally may be larger than the diameter D of the roller body 110, for which the pocket 115 is designed.

FIG. 2c illustrates how the roller body 110 can be inserted into the pocket of the cage 110 past the retaining rim 120. FIG. 2d shows the roller body 110 disposed in the cage 100, wherein it is held by the outer bearing ring 220 on the right side. The retaining rim 120 prevents the roller body 110 from rolling out towards the left side of the drawings. Of course, other geometries of the various features of the retaining rim 120, the pocket 115, the bearing ring 220, etc. are also conceivable in other embodiments, with which the same effect can be achieved.

In the next assembly step shown in FIG. 2e, the inner bearing ring 210 is mounted. In this exemplary method, the inner bearing ring 210 is displaced or moved from above onto or into the assembly of the cage 100, roller bodies 110 and outer bearing ring 220. The retaining rim(s) 120 prevents the roller body(ies) 110 from rolling or falling out of the assembly during this mounting step.

FIG. 2f shows the final assembled state of the bearing 200. In this state, shields or covers 310 optionally may be inserted between or around the inner bearing ring 210 and the outer bearing ring 220, for example, in order to prevent the interior of the bearing from being contaminated by outside influences (e.g., dirt and/or moisture).

Of course, the assembly process described with the assistance of FIGS. 2a to 2f and/or the manufacturing- or assembly method, can also be performed in another sequence. In addition, other types of bearings can be assembled using the present teachings. The exemplary embodiment described herein demonstrates that the assembly process is simplified by the retaining rim 120, because the roller bodies 110 can not roll out or away during the assembly process.

Embodiments of the present teachings are not limited to one-row bearing embodiments. For example, the assembly of two-row angular contact ball bearings also can be significantly simplified by utilizing the retaining rim 120 of the present teachings.

The present teachings offer the advantage that the existing design of a non-snap-type cage having a maximum roller body occupation is improved such that the primary disadvantage of the dislocation of the roller bodies during the bearing assembly is reduced or even eliminated. As a result, it is made possible to devise roller bearings that have a maximum load rating, i.e. that utilize a maximum number of roller bodies, for the particular circumference of the bearing rings and the minimum bridge widths between pockets. At the same time, the disadvantage of the complicated assembly, which is connected therewith, is also overcome, because it is possible to forgo the need for additional tools to retain the roller bodies during the assembly. This is made possible by the above-described retaining rim 120 on the cage 110.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cages and roller bearings and methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Cage
105a Wall height of the cage
105b Wall height of the cage and the retaining rim
105c Wall thickness of the cage
105d Wall thickness of the cage and the retaining rim
110 Roller body
115 Pocket
120 Retaining rim
200 Roller bearing
210 Inner ring
220 Outer ring
300 Diagonal axis
310 Cover
350 Roller bearing
360 Inner ring
370 Outer ring
380 Cage
390 Roller body
400 Diagonal axis
410 Pocket
420 Cut line
430 Cut line

The invention claimed is:

1. An annular cage for a rolling bearing, comprising:
a main body having a radially outer side and a radially inner side,
at least one cylindrical bore extending from the main body outer side to the main body inner side and forming a pocket configured to receive a rolling body, and
at least one retaining rim disposed on an axial end of the at least one pocket and configured to retain the rolling body in the cylindrical bore,
wherein the retaining rim extends in at least in a radial direction of the cage relative to the main body, and
wherein the retaining rim extends radially from the main body and also axially extends at least partially into an interior space defined by a projection of an interior, radially-extending wall of the pocket.

2. The annular cage according to claim 1, wherein the annular cage is configured to be mounted between an inner ring and an outer ring of the rolling bearing.

3. The annular cage according to claim 2, wherein the annular cage has a plurality of pockets, which provide predetermined spacings for a plurality of rolling bodies from each other on a pitch circle of the rolling bearing, wherein the cage is configured to receive a maximum number of rolling bodies in accordance with the diameters of the inner ring, the outer ring and the rolling bodies.

4. The annular cage according to claim 3, wherein a sum of the predetermined spacings is less than eight-times the diameter of one rolling body.

5. The annular cage according to claim 4, wherein the retaining rim is disposed on a side of the main body configured to face towards the inner ring.

6. The annular cage according to claim 5, wherein it is configured as a ring-guided annular cage.

7. The annular cage according to claim 6, wherein a minimum opening distance (d) between the retaining rim and an axially-opposite edge of the pocket is larger than the diameter (D) of the rolling body.

8. An angular contact ball bearing comprising:
an inner ring,
an outer ring and
the annular cage according to claim 7 disposed between the inner and outer rings, and
a plurality of roller bodies respectively guided in the pockets of the annular cage,
wherein the inner and outer rings are shaped to provide a diagonal contact axis for the roller bodies.

9. A method for assembling a roller bearing comprising:
mounting the cage according to claim 3, on a first bearing ring,
inserting a plurality of roller bodies into the cage by moving the roller bodies along a movement path that includes both radial and axial movement components relative to radially-extending side walls of the pockets of the cage; and
mounting a second bearing ring on the combination of the first bearing ring, the cage and the roller bodies.

10. The annular cage according to claim 1, wherein a minimum opening distance (d) between the retaining rim and an axially-opposite edge of the pocket is larger than the diameter (D) of the rolling body.

11. A rolling bearing comprising:
an inner ring,
an outer ring,
the annular cage according to claim 1, disposed between the inner and outer rings, and
at least one rolling body guided in the at least one pocket of the annular cage.

12. The roller bearing according to claim 11, wherein the inner and outer rings are shaped for a one- or two-row angular contact ball bearing.

13. The annular cage according to claim 1, wherein a minimum opening distance between the retaining rim and an axially-opposite edge of the cylindrical bore is larger than a diameter of the roller body.

14. An annular cage for a roller bearing, comprising:
a main body having a radially outer side and a radially inner side,
at least one cylindrical bore extending from the main body outer side to the main body inner side and forming a pocket configured to receive a roller body, and
at least one retaining rim configured to retain the roller body in the pocket and disposed on an axial end of the at least one pocket,
wherein the retaining rim extends radially from the main body and extends axially at least partially over the at least one pocket.

15. The annular cage according to claim 14, wherein a minimum opening distance between the retaining rim and an axially-opposite edge of the cylindrical bore is larger than a diameter of the roller body.

* * * * *